United States Patent [19]

Nickles

[11] 3,964,530
[45] June 22, 1976

[54] LOCKING CUP WASHER

[75] Inventor: Lawrence H. Nickles, Indianapolis, Ind.

[73] Assignee: General Motors Corporation, Detroit, Mich.

[22] Filed: May 30, 1972

[21] Appl. No.: 257,885

[52] U.S. Cl. .............................. 151/29; 151/2 A; 151/55
[51] Int. Cl.² ..................................... F16B 39/08
[58] Field of Search .................. 151/28, 29, 55, 54, 151/2 A

[56] References Cited
UNITED STATES PATENTS

| | | | |
|---|---|---|---|
| 1,002,452 | 9/1911 | Rickards | 151/29 |
| 2,101,678 | 12/1937 | Herschmann | 151/29 |
| 2,469,441 | 5/1949 | Pitisci | 151/54 |
| 2,879,089 | 3/1959 | Kobylinski | 151/28 |

FOREIGN PATENTS OR APPLICATIONS 315,505   9/1920   Germany .............................. 151/29

Primary Examiner—Roy D. Frazier
Attorney, Agent, or Firm—Arthur N. Krein

[57] ABSTRACT

A nut locking device in the form of a cup washer with a slotted base portion is secured over the end tang of an external threaded fastener so that the outer lip portion of the cup washer engages over and locks against the outer peripheral edges of a nut threaded on the fastener to maintain the nut in a set position on the fastener.

5 Claims, 5 Drawing Figures

LOCKING CUP WASHER

The invention herein described was made in the course of work under a contract or subcontract thereunder with the Department of Defense.

This invention relates to a device for locking a nut on an external threaded anchor in machine parts and, in particular, to a lock washer to maintain a nut in a fixed position on an external threaded anchor.

Numerous nut locking devices have been used to retain a nut in a fixed position on an externally threaded fastener, such as a bolt, stud or other type external threaded anchor of the type used in the assembly of machine parts. For example, helical spring lock washers and tooth-type lock washers are two well-known types of such locking devices, but both of these types of lock washers are so formed that they must be placed under the nut to be turned in the tightening operation of the nut and, because of this latter feature and other features which need not be described herein, they are not suitable for use in certain machine applications.

Another form of nut locking device is the so-called tab-type washer which is fixed over the nut, but all such known type washers require proper rotational setting with respect to the threaded fastener and nut so that the tabs of this type washer can be properly aligned with slots or other flats on the nut for engagement therewith to perform its nut locking function. That is, when using such a tab-type washer, the nut must first be set to its desired position but if the tabs of the tab-type washer are not then properly aligned with the nut, the nut must then either be further tightened or backed off until the tabs of the washer are in alignment with the slots or flats on the nut.

It is therefore an object of this invention to provide a nut locking device which is capable of engaging and locking a nut at infinitely variable rotational settings of the nut with respect to the nut locking device and which is adapted to be used with the nut after the nut has been properly positioned.

Another object of this invention is to provide a nut lock which may be readily applied to a nut after the nut is set at a definite position on an externally threaded fastener regardless of the rotative position of the nut thereon.

These and other objects of the invention are attained by means of a nut lock in the form of a cup-shaped washer having a slotted base portion which is adapted to be inserted over the end tang of an externally threaded fastener, the washer preferably having an annular conical-shaped rim with an outer free lip portion of a diameter to slide over the outer peripheral edge portions of a nut to engage and lock against these outer edges of the nut to thereby lock it in position on the fastener.

For a better understanding of the invention, as well as other objects and further features thereof, reference is had to the following detailed description of the invention to be read in connection with the accompanying drawings, wherein.

Figure 1:
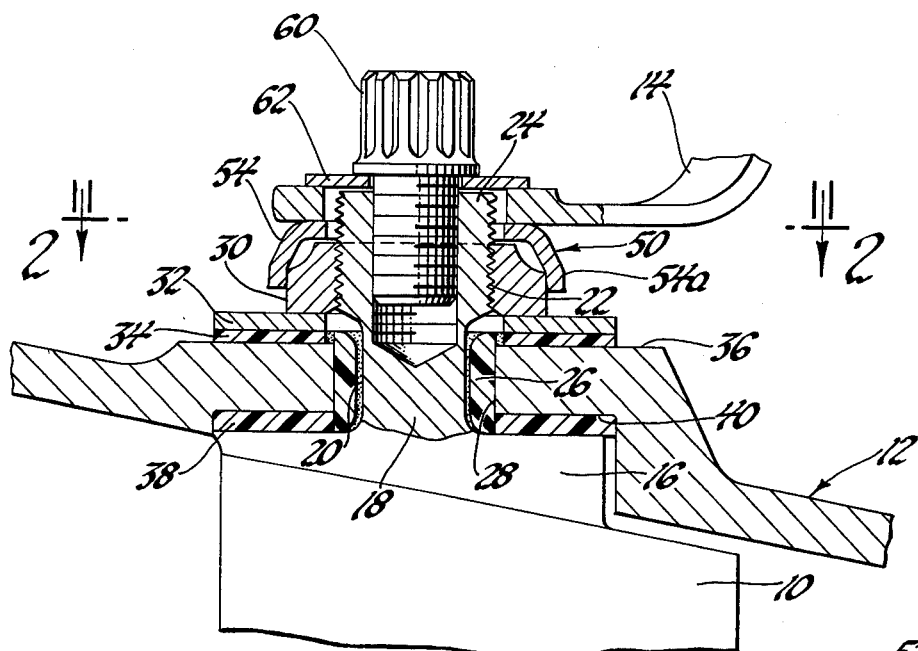
FIG. 1 is a sectional view of a portion of a variable compressor vane actuating mechanism of a gas turbine engine having a locking cup washer in accordance with the invention used in the assembly of this mechanism.

For the purpose of illustrating a particular mechanism in which the locking cup washer of the invention is used, there is shown in FIG. 1 a variable compressor vane actuating mechanism of a gas turbine engine wherein a stator vane 10 is rotatably mounted in the outer case 12 of the compressor for actuation by a suitable actuator, not shown, since it forms no part of the invention, but which includes an actuating arm 14 fixed to the stator vane for pivotal movement therewith.

As shown, the stator vane 10 is provided with an annular main bearing body portion 16 having a stem 18 extending therefrom, the stem being provided with an undercut portion 20 adjacent to the body portion and a threaded free end portion 22 terminating in a tang 24. The stator vane 10 is rotatably journalled with respect to the outer case 12 by means of a split bearing 26 encircling the undercut portion 20 and positioned within a suitable aperture 28 in the outer case. Stator vane 10 is supported by means of the vane retention nut 30 seated against a steel washer 32, with a bearing washer 34 interposed between the steel washer 32 and the machined pad 36 of the outer case 12, a similar bearing washer 38 being interposed between the bearing body portion 16 and the machined undercut 40 in the outer case 12.

In this type mechanism, the position of the vane retention nut 30 is critical, since this nut must be threaded down onto the threaded portion 22 of stem 18 of the stator vane 10 sufficiently tight to clamp up the stator vane 10 with respect to the bearing washers 34 and 38 and the outer case 12 to prevent leakage around these elements but not tight enough to incur binding between these elements. Accordingly, once the vane retention nut 30 has been tightened up to a set position to rotatably retain the stator vane 10 to the outer case 12, this set position of this nut should be retained.

Figure 5:
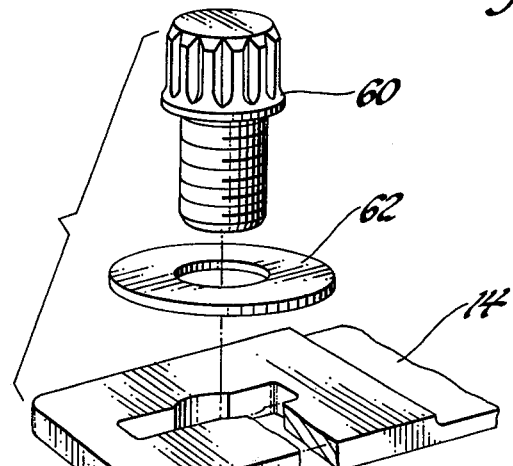
Figure 2:
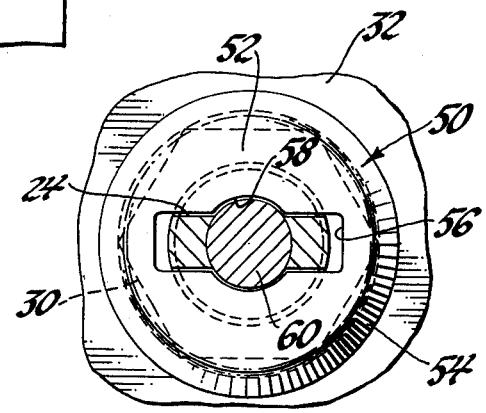
FIG. 2 is a view taken along line 2—2 of FIG. 1.

Now in accordance with the invention, the set position of the vane retention nut 30 is maintained by a nut lock in the form of a cup washer 50 constructed in accordance with the invention. As best seen in FIG. 5, the cup washer includes an annular base portion 52 with a skirt portion or rim 54 preferably of conical configuration, as shown, extending from this base portion and formed integral therewith. To prevent rotation of the nut lock on the fastener, the base portion 52 is formed with an elongated slot 56 therein, preferably of a length and width slightly larger than that of the tang 24 on the stator vane stem 18 so as to be readily slidable axially thereover but locked against rotation relative thereto and with a central aperture 58 to receive a self-locking cap bolt 60.

Figure 3:
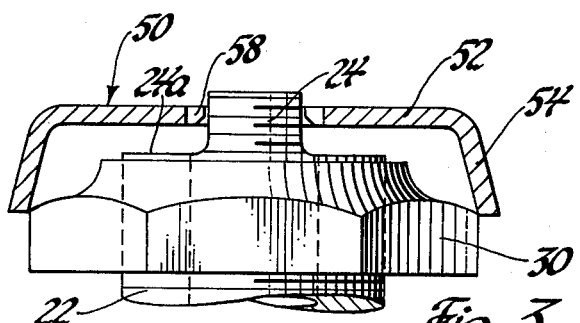
FIG. 3 is an enlarged view showing the locking cup washer of the invention positioned over a nut prior to being positioned in locking engagement therewith.

As formed, the cup washer is of the configuration as shown in FIG. 3, so that the inside diameter of the conical skirt portion 54 at its free end is just slightly larger in diameter than the outer corner edges of the polygonal outer periphery of the vane retention nut 30 so as to just slide over the upper outer corner edges of the nut as seen in this figure.

The vane retention nut 30 is shown as a hex nut although it is to be realized that a nut having any number of flat side surfaces thereon meeting at corner edges to define a polygonal periphery thereabout may be used, in lieu of the hex nut shown, with the subject nut lock.

Figure 4:
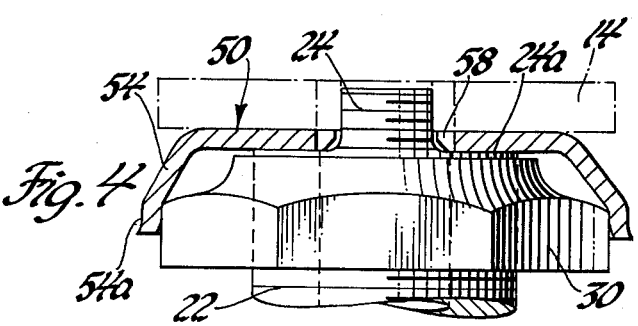
FIG. 4 is a view similar to that of FIG. 3 but showing the locking cup washer in locking engagement with the nut; and, FIG. 5 is an exploded perspective view of a portion of the structure of FIG. 1.

In assembly, after the actuator arm is positioned over the tang 24 of the stator vane stem, the cup washer 50 is forced axially, downward with reference to FIG. 3, along the fastener over the nut 30 by means of the axial force applied by the self-locking cap bolt 60 as it is threaded into the internal threads in the end of the vane stem, this force being applied through suitable means, such as the washer 62 and the actuating arm 14 against the base portion 52 of the cup washer to force the skirt portion thereof down over the corner edges of the nut deforming the skirt portion 54, as indicated at 54a in FIG. 4 into locking engagement with the outer peripheral corner edges of the vane retention nut. The washer 50 can be moved axially down the fastener until it is either seated against the upper surface of the vane retention nut 30 or, as shown in FIG. 4, against a shoulder on the tang portion of the fastener, that is against the shoulder 24a on the stem 18 at the base of tang 24.

In order to have the skirt portion of the cup washer deformed as shown in FIG. 4 to lock against the corner edges of a nut, it is preferably made of a suitable deformable material, such as aluminum or a dead soft steel, and of the desired thickness to permit this deformation with minimum end forces on the threaded joint and, so that this deformation can readily be made by hand wrenching of the bolt 60.

As illustrated in the preferred embodiment of the invention, the cup washer 50 is formed with a conical skirt portion 54, inclined preferably at an angle of approximately 15° to the vertical axis through the washer as seen in FIG. 3, but it is to be realized that this skirt portion can be formed cylindrical in configuration, however with a cylindrical skirt, the nut would require an enlarged chamfer at the corner edges thereof to provide for skirt lead-in over the nut similar to that shown in FIG. 3.

When using the preferred embodiment of the nut lock in the form of a cup washer with the conical skirt portion 54 and in order to utilize such a cup washer with minimum skirt length, the latter being desirable in the mechanism shown, to provide for a compact and lightweight assembly, the nut 30 is formed, as shown, with a hex base and with an upper cylindrical crown, this nut being similar to a castle nut but without the milled slots in the crown, or alternately, not shown, the nut can be formed similar to an open top acorn-type nut with a hex base and conical upper end.

With the arrangement of the nut lock shown in the form of a cup washer, it need only be indexed relative to the tang of the fastener, but it need not be indexed relative to the nut, thus eliminating the need to rotate the nut from its set position in order to effect locking of the nut.

What is claimed is:

1. In combination with a threaded fastener having a tang at its free end and a nut having flat side surfaces meeting at corner edges to define a polygonal periphery thereabout, threaded thereon, a nut lock of deformable material having an annular base portion with a slot therein slidably received over the tang in locking engagement therewith and having a depending annular skirt portion integral therewith, said skirt portion having an internal diameter at its free end so as to just engage over the corner edges of the nut and, means including threaded means secured to said threaded fastener for moving said nut lock axially on said threaded fastener to move said skirt portion further over said nut while deforming said skirt portion around said corner edges of said nut and to retain said nut lock as then deformed axially on said threaded fastener relative to said nut.

2. In the combination of claim 1 wherein said skirt portion of said nut lock is of conical configuration and extends radially outward from said base portion.

3. In combination with an externally threaded fastener and a nut threaded on said fastener, said nut having external wrenching surfaces joining at corners on the exterior thereof, a nut lock in the form of a cup-shaped washer of deformable material having a circular disk-like base portion with an aperture therethrough slidably received over said fastener and a depending annular skirt portion integral therewith, said skirt portion having an internal diameter at its free end of a size so as to just engage over said corners of said nut, said base portion of said cup washer and said fastener including anti-rotational means to retain said nut lock against rotation with respect to said fastener and, drive and retainer means operatively connected to said fastener and abutting one side of said base portion to force said nut lock axially on said fastener in a direction moving said skirt portion further over said nut whereby said skirt portion is partly deformed around said corners into locking engagement with said nut and to retain said skirt portion of said nut lock as thus deformed in locking engagement with said nut.

4. In the combination of claim 3 wherein said skirt portion of said nut lock is of a conical configuration extending radially outward from said base portion.

5. In the combination of claim 4 wherein said anti-rotational means to retain said nut lock rotatively with respect to said fastener includes a tang at the free end of said fastener over which said nut has been threaded and wherein said aperture in said base portion includes a complementary formed slot to slidably receive said tang and wherein said drive and retainer means includes a self-locking bolt threaded into the free end of said fastener and planar surface means in abutment against the surface of said base portion opposite said skirt portion.

* * * * *